United States Patent
Achlaug et al.

(10) Patent No.: US 9,645,959 B2
(45) Date of Patent: May 9, 2017

(54) FAST LINK TRAINING IN EMBEDDED SYSTEMS

(71) Applicant: QUALCOMM Incorporated, San Diego, CA (US)

(72) Inventors: Nabeel Achlaug, Kfar Kama (IL); Nir Gerber, Haifa (IL); Sergio Kolor, Haifa (IL); Dan Vardi, Haifa (IL)

(73) Assignee: QULACOMM Incorporated, San Diego, CA (US)

(*) Notice: Subject to any disclaimer, the term of this patent is extended or adjusted under 35 U.S.C. 154(b) by 370 days.

(21) Appl. No.: 14/598,325

(22) Filed: Jan. 16, 2015

(65) Prior Publication Data

US 2016/0210254 A1    Jul. 21, 2016

(51) Int. Cl.
G06F 13/38    (2006.01)
G06F 13/42    (2006.01)

(52) U.S. Cl.
CPC ........ *G06F 13/385* (2013.01); *G06F 13/4291* (2013.01); *G06F 13/4295* (2013.01); *G06F 2213/0026* (2013.01); *Y02B 60/1228* (2013.01); *Y02B 60/1235* (2013.01)

(58) Field of Classification Search
CPC .......... G06F 13/14; G06F 13/20; G06F 13/38; G06F 13/382; G06F 13/385; G06F 13/40; G06F 13/4063; G06F 13/42; G06F 13/4265; G06F 13/4282; G06F 13/4291; G06F 13/4295
See application file for complete search history.

(56) References Cited

U.S. PATENT DOCUMENTS 7,752,372 B2    7/2010  Mussatt et al.
7,853,731 B1    12/2010 Zeng
8,327,042 B2    12/2012 Millsaps
(Continued)

OTHER PUBLICATIONS

"AR#45859 Design Assistant for PCI Express—How to bypass receiver detect when using the Virtex-6 Integrated Block for PCI Express". Xilinx, Inc. Online Mar. 13, 2013. Retrieved from Internet Mar. 13, 2017. <http://www.xilinx.com/support/answers/45859.html>.*

(Continued)

*Primary Examiner* — Thomas J Cleary
(74) *Attorney, Agent, or Firm* — Withrow & Terranova, PLLC (57) ABSTRACT

Fast link training in embedded systems is disclosed. In one aspect, a host takes advantage of situations in which the host is coupled to one or more static devices through a communication bus. In particular, because the one or more devices are static, the host may be provided with information about the one or more devices before start up, so that when the host does perform a start up, the host already knows which device(s) to expect. Accordingly, the host may directly query the expected device(s), and after receipt of response(s) from the expected device(s), may begin link training the expected device(s). By using the provided information about the expected device(s) in this fashion, the host may bypass or skip an initial signal detection step used by conventional link training processes. Bypassing the initial signal detection step may save time, which in turn saves power.

35 Claims, 6 Drawing Sheets

(56) References Cited

U.S. PATENT DOCUMENTS

| | | | |
|---|---|---|---|
| 8,549,205 B1 * | 10/2013 | Harriman | G06F 13/4027 |
| | | | 370/254 |
| 8,582,448 B2 | 11/2013 | Khatri et al. | |
| 2006/0023633 A1 * | 2/2006 | Caruk | G06F 1/325 |
| | | | 370/252 |
| 2007/0186088 A1 | 8/2007 | Khatri et al. | |
| 2012/0317607 A1 | 12/2012 | Wyatt et al. | |
| 2013/0051483 A1 * | 2/2013 | Wyatt | H04L 25/03885 |
| | | | 375/259 |
| 2014/0006675 A1 | 1/2014 | Meir | |
| 2014/0119381 A1 * | 5/2014 | Diab | H04L 12/40 |
| | | | 370/431 |
| 2014/0195830 A1 | 7/2014 | Chin et al. | |
| 2014/0273852 A1 * | 9/2014 | McCormack | H04B 5/0031 |
| | | | 455/41.2 |

OTHER PUBLICATIONS

International Search Report and Written Opinion for PCT/US2015/064913, mailed Apr. 15, 2016, 10 pages.

Second Written Opinion for PCT/US2015/064913, mailed Jan. 23, 2017, 5 pages.

* cited by examiner

FAST LINK TRAINING IN EMBEDDED SYSTEMS

BACKGROUND

I. Field of the Disclosure

The technology of the disclosure relates generally to communication buses in computing devices.

II. Background

Computing devices have become common in nearly every facet of daily life. Whether a computing device is mobile, such as a smart phone or a tablet device, or relatively stationary, such as a desktop computer, such computing devices are typically formed from a variety of elements that are communicatively coupled to one another through a communication bus. For example, an application processor may communicate with a modem processor across the communication bus within the computing device.

While there are myriad communication buses complying with different standards, a common type of communication interface is the peripheral component interface (PCI), which has a number of popular variants such as the PCI express (PCIe) standard. The PCIe specification defines a complex mechanism for detecting the number of devices coupled to a PCIe communication bus and the width (expressed as a number of lanes) of each device's link. This mechanism does not make any assumptions about the number or types of devices, and relies only on receiver probing and lane numbering to detect topology. Accordingly, this mechanism is relatively time consuming In situations where the topology is (or can be) dynamic, the mechanism's worth is fully established. For example, in a desktop computing device or server, a user may connect or disconnect a variety of add-in cards to the communication bus. Because the link width may vary between add-in cards, the mechanism allows the host of the communication bus to learn the link width of any newly inserted add-in card and act accordingly. While the mechanism is sufficiently robust for such dynamic environments, the mechanism is arguably over-engineered for static environments. Accordingly, there may be ways to reduce the amount of time spent on link training in static communication bus configurations. Such time savings may save power or reduce delays in system initialization or restarts.

SUMMARY OF THE DISCLOSURE

Aspects disclosed in the detailed description include fast link training in embedded systems. In an exemplary aspect, a host takes advantage of situations in which the host is coupled to one or more static devices through a communication bus. In particular, because the one or more devices are static, the host may be provided with information about the one or more devices before start up, so that when the host does perform a start up, the host already knows which device(s) and link width to expect. Accordingly, the host may directly query the expected device(s) and after receipt of response(s) from the expected device(s), may begin link training the expected device(s). By using the provided information about the expected device(s) in this fashion, the host may bypass or skip an initial signal detection step used by conventional link training processes. Bypassing the initial signal detection step may save time, which in turn saves power. While applicable to myriad systems, in a particularly contemplated aspect, the system complies with the peripheral component interface (PCI) express (PCIe) protocols and the expected devices are PCIe endpoints.

In this regard, in one aspect, a method of link detection for a communication bus is disclosed. The method comprises providing an indication to a host which links are expected. The method also comprises, based on the indication, testing expected links. The method further comprises receiving at least a response from a device associated with at least one expected link. The method further comprises training the device associated with the at least one expected link.

In another aspect, a host is disclosed. The host comprises a bus interface configured to be connected to a communication bus. The host also comprises a control system operatively coupled to the bus interface. The control system is configured to receive an indication which links for the communication bus are expected. The control system is also configured to, based on the indication, test expected links across the communication bus. The control system is further configured to receive at least a response from a device associated with at least one expected link. The control system is also configured to train the device associated with the at least one expected link.

In another aspect, a computing system is disclosed. The computing system comprises a communication bus. The computing system also comprises a plurality of devices, each device comprising a device bus interface connected to the communication bus. The computing system also comprises a host which further comprises a bus interface connected to the communication bus. The host also comprises a control system operatively coupled to the bus interface. The control system is configured to receive an indication which links for the communication bus are expected to exist for respective ones of the plurality of devices. The control system is further configured to, based on the indication, test expected links across the communication bus. The control system is also configured to receive at least a response from a device associated with at least one expected link. The control system is also configured to train the device associated with the at least one expected link.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include fast link training in embedded systems. In an exemplary aspect, a host takes advantage of situations in which the host is coupled to one or more static devices through a communication bus. In particular, because the one or more devices are static, the host may be provided with information about the one or more devices before start up, so that when the host does perform a start up, the host already knows which device(s) and link width to expect. Accordingly, the host may directly query the expected device(s) and after receipt of response(s) from the expected device(s), may begin link training the expected device(s). By using the provided information about the expected device(s) in this fashion, the host may bypass or skip an initial signal detection step used by conventional link training processes. Bypassing the initial signal detection step may save time, which in turn saves power. While applicable to myriad systems, in a particularly contemplated aspect, the system complies with the peripheral component interface (PCI) express (PCIe) protocols and the expected devices are PCIe endpoints.

Exemplary aspects of the present disclosure are well-suited for use with an embedded peripheral component interface (PCI) communication bus, and in particular for a PCI express (PCIe) communication bus. Thus, the expected PCIe endpoints and expected link width may be predefined to reduce link training times. Exemplary aspects allow implementation without breaking interoperability with other PCIe compliant devices. While exemplary aspects are beneficial for PCIe communication buses, other embedded communication buses that have link training regimes may also benefit from the present disclosure.

Figure 1:
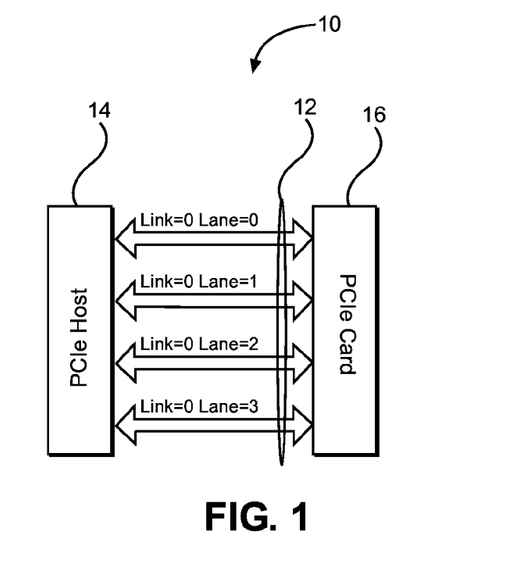
FIG. 1 is a block diagram of a computing device with an exemplary embedded communication bus with a host and a single device using all available lanes for a single link.

In this regard, FIG. 1 is a simplified block diagram of a computing device 10 with an embedded communication bus 12 coupled to a host 14 and a device 16. In an exemplary aspect, the communication bus 12 is a PCIe bus, the host 14 is a PCIe host, and the device 16 may be a PCIe card. The communication bus 12 has a link (link=0) to the device 16 formed from four lanes (lanes 0 to 3). As illustrated, the device 16 uses all of the available lanes (0-3) to form the link. However, not every device will require as many lanes as the device 16 in FIG. 1.

Figure 2:
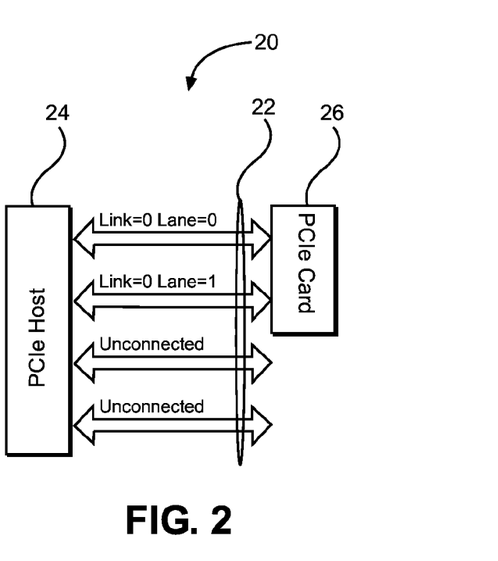
FIG. 2 is a block diagram of a computing device with an exemplary embedded communication bus with a host and single device that does not use all available lanes for a single link.

In this regard, FIG. 2 illustrates a computing device 20 with an embedded communication bus 22 coupled to a host 24 and a device 26. In an exemplary aspect, the communication bus 22 is a PCIe bus, the host 24 is a PCIe host, and the device 26 may be a PCIe card. The communication bus 22 has a link (link=0) to the device 26 formed from two lanes (lanes 0 and 1). Other lanes are unconnected.

Figure 3:
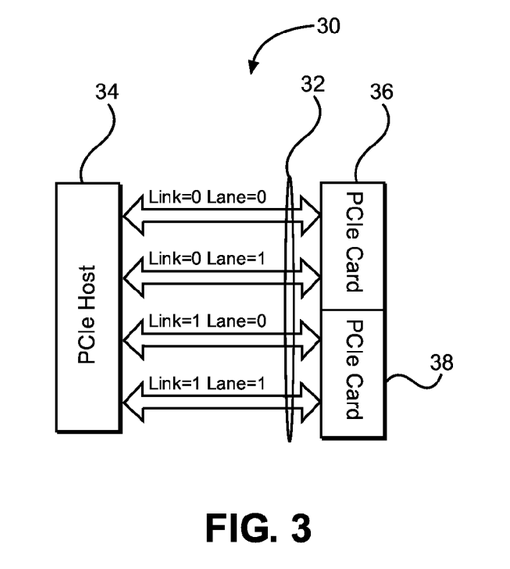
FIG. 3 is a block diagram of a computing device with an exemplary embedded communication bus with a host and plural devices that use multiple links having lanes associated therewith.

Similarly, FIG. 3 illustrates a computing device 30 with an embedded communication bus 32 coupled to a host 34, a first device 36, and a second device 38. In an exemplary aspect, the communication bus 32 is a PCIe bus, the host 34 is a PCIe host, and the first and second devices 36 and 38 may each be a PCIe card. The communication bus 32 has a first link (link=0) to the first device 36 formed from two lanes (lanes 0 and 1). The communication bus 32 has a second link (link=1) to the second device 38 formed from two lanes (lanes 0 and 1). While FIG. 3 illustrates the computing device 30 with symmetrical links between the host 34 and the first and second devices 36 and 38, exemplary aspects of the present disclosure apply to non-symmetrical links as well.

Figure 4:
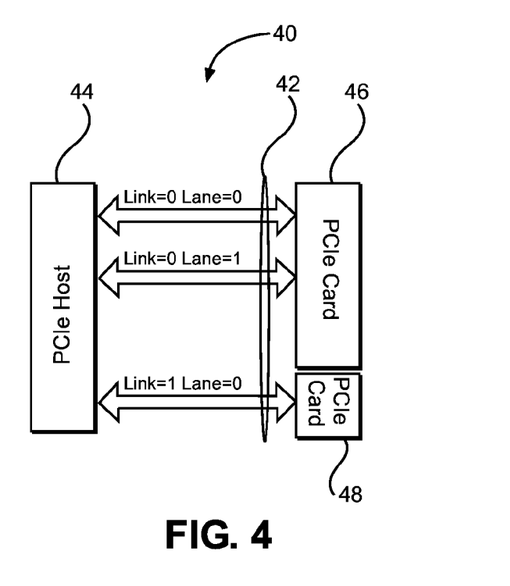
FIG. 4 is a block diagram of a computing device with an exemplary embedded communication bus with a host and plural devices having asymmetrical lanes forming respective links.

In this regard, FIG. 4 illustrates a computing device 40 with a PCIe communication bus 42 coupled to a host 44, a first device 46, and a second device 48. The PCIe communication bus 42 has a first link (link=0) to the first device 46 formed from two lanes (lanes 0-1). The PCIe communication bus 42 has a second link (link=1) to the second device 48 formed from one lane (lane 0).

While the computing devices 10, 20, 30, and 40 of FIGS. 1-4 have only one or two devices, it should be appreciated that the communication buses 12, 22, 32, and 42 may be coupled to one, two, or more than two devices depending on the particular needs of the computing device 10, 20, 30, 40. Likewise, while not explicitly illustrated, it should be appreciated that each host and device may include a respective bus interface designed to couple the host or device to the communication bus. Likewise, each host or device may further include a control system or control logic that is able to implement aspects of the present disclosure.

Figure 5A:
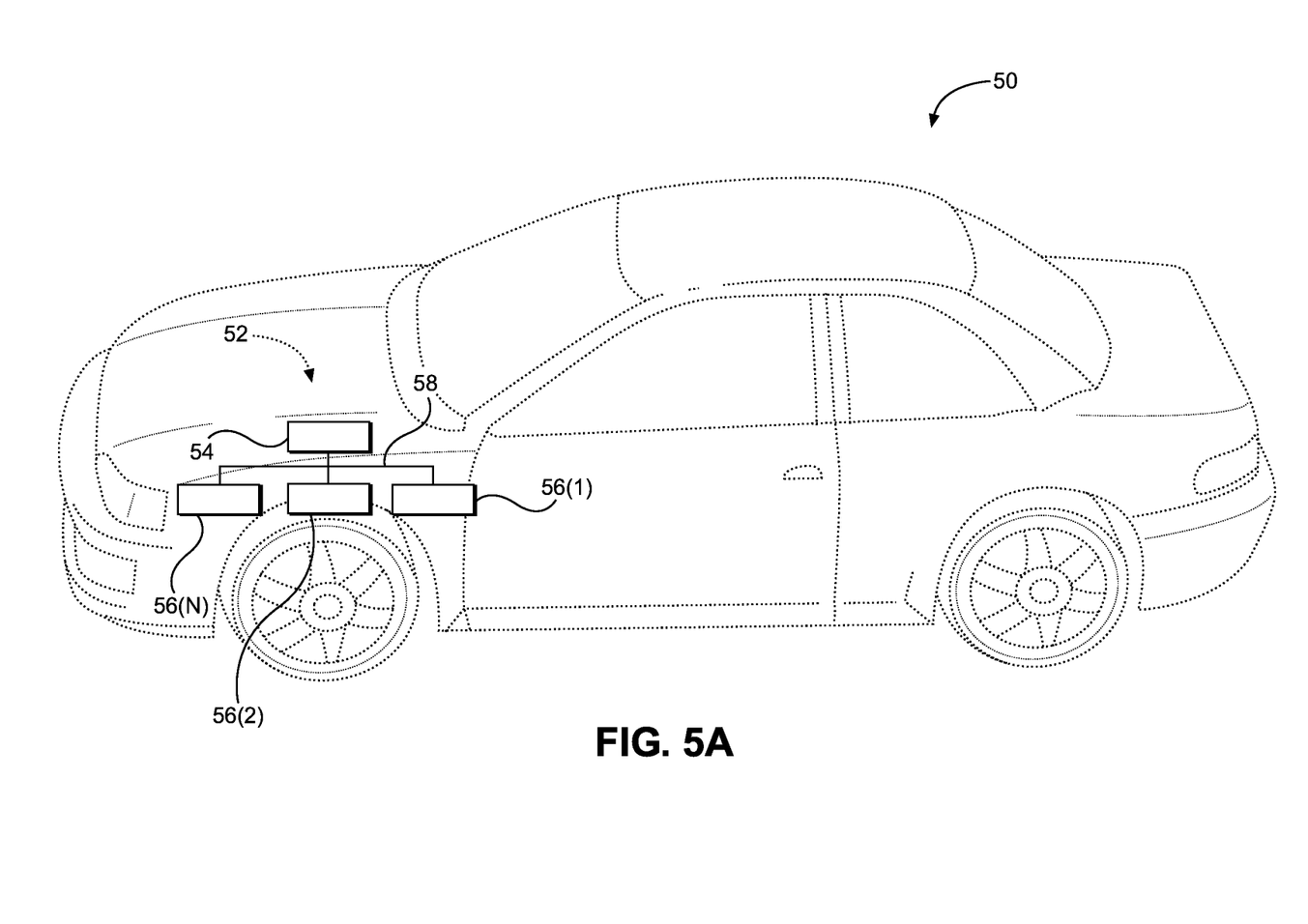
FIG. 5A illustrates an automobile that may have an embedded communication bus according to an exemplary aspect of the present disclosure.

While exemplary aspects of the present disclosure are applicable to myriad computing devices with differing topologies, one exemplary aspect of the present disclosure is in the automotive industry. As illustrated in FIG. 5A, an automobile 50 may include a computing device 52 having a host 54 with multiple devices 56(1)-56(N) coupled to the host 54 through an embedded communication bus 58. In an exemplary aspect, the multiple devices 56(1)-56(N) are static devices (i.e., they are not removed from the communication bus 58 after installation) and the communication bus 58 is a PCIe-compliant communication bus. In such an aspect, the multiple devices 56(1)-56(N) may be PCIe cards or other PCIe-compliant devices.

Figure 5B:
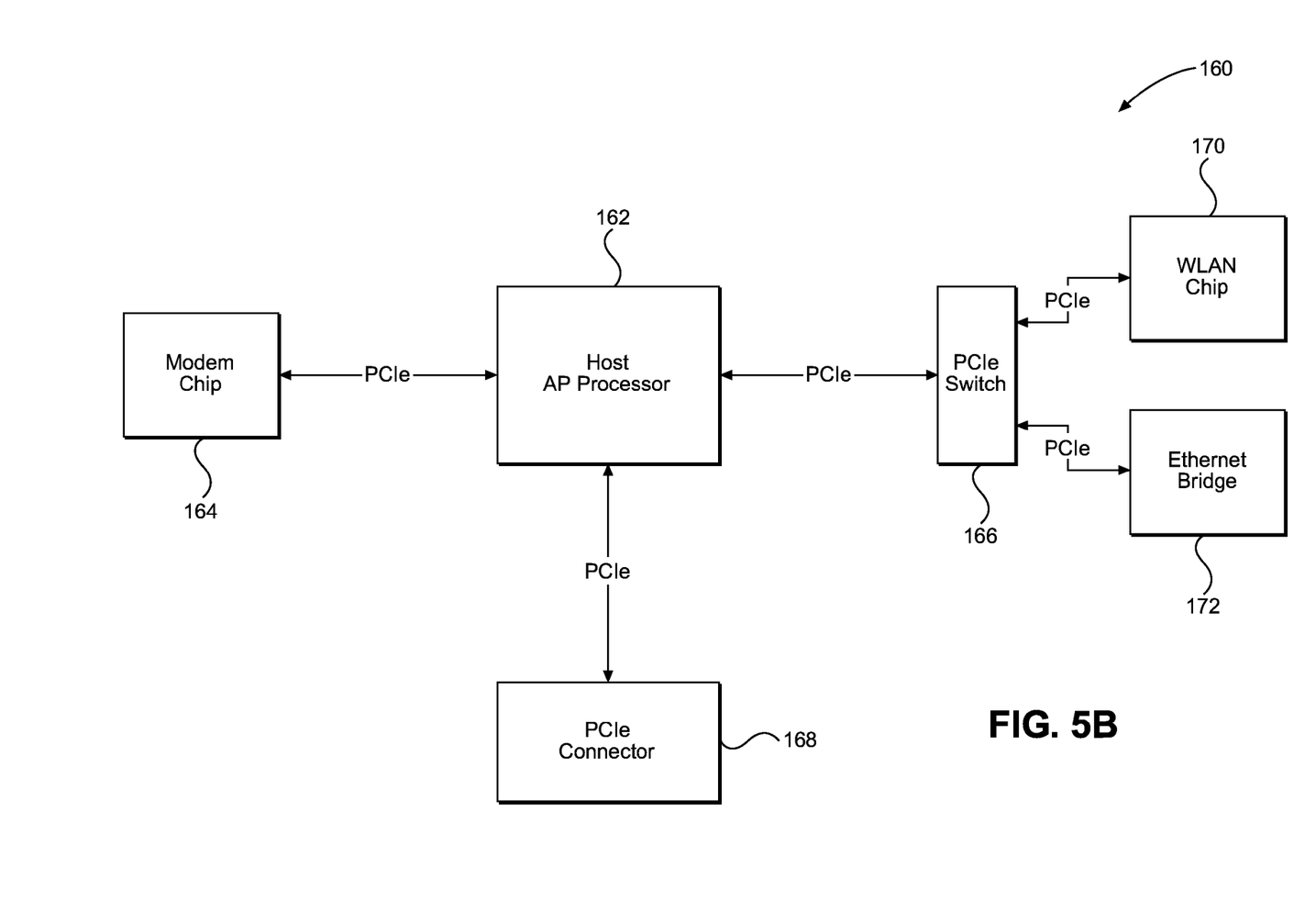
FIG. 5B illustrates a mobile terminal that may have an embedded communication bus according to an exemplary aspect of the present disclosure.

Another exemplary aspect of the present disclosure is in the mobile communication industry. FIG. 5B illustrates a mobile terminal 160 with a host 162. The host 162 may be located in an application processor (AP) as noted. The host 162 is coupled to multiple devices such as a modem chip 164, a PCIe switch 166, and a PCIe connector 168. The PCIe switch 166 may be connected to a WLAN chip 170 and an Ethernet bridge 172. The connections between the host 162 and the modem chip 164, the PCIe switch 166, and the PCIe connector 168 may be separate PCIe-compliant communication buses (as illustrated) or a combined PCIe-compliant communication bus (not illustrated). In an exemplary aspect, at least the modem chip 164 and the PCIe switch 166 are static devices (i.e., they are not removed from the communication bus after installation). In contrast, the PCIe connector 168 may be a dynamic device that is selectively plugged in and removed.

It should be appreciated that in instances where the hosts 14, 24, 34, 44, 54, and 162 of FIGS. 1-5B are PCIe hosts, the hosts may include a PCIe root complex. Likewise, in instances where the devices 16, 26, 36, 38, 46, 48, and 56(1)-56(N), the modem chip 164, the PCIe switch 166, and the PCIe connector 168 are PCIe devices, the devices may include PCIe endpoints.

Figure 6:
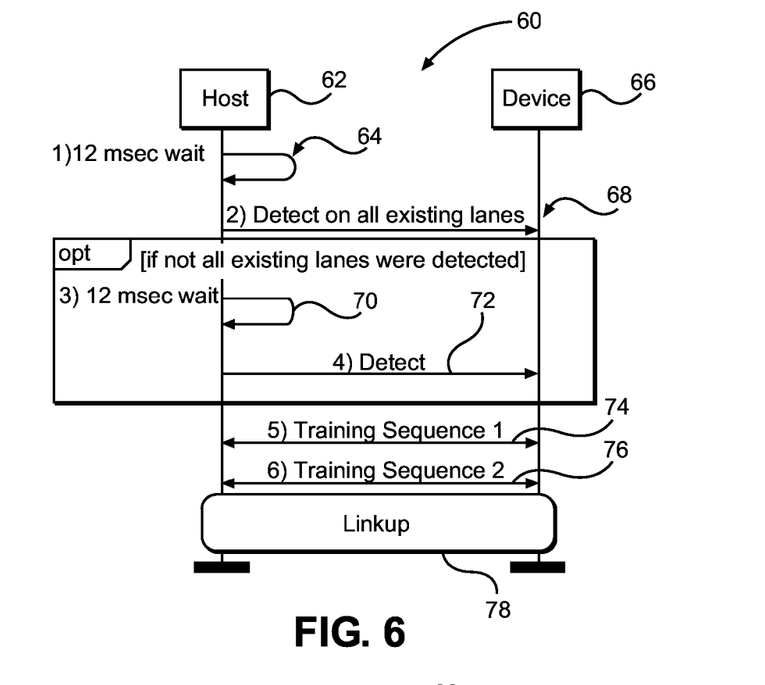
FIG. 6 is a conventional link training flow diagram for a peripheral component interface (PCI) express (PCIe) communication bus.

In conventional PCIe systems, a host must perform a specific process to identify and train links on a communication bus. A conventional signal flow 60 is illustrated in FIG. 6 so that the improvements of the present disclosure may be contrasted therefrom. In particular, the process associated with the signal flow 60 waits twelve (12) milliseconds or until the signal detection is received at a host 62 (noted generally at line 64). The host 62 then performs receiver detection on all lanes by transmitting to device(s) 66 (noted generally at signal 68). If not all lanes are detected, the host 62 waits an additional twelve (12) milliseconds (noted generally at line 70) and then repeats the receiver detection (noted generally at signal 72). If the links detected at the signal 72 are the same as those detected at the signal 68, then link training continues with a training sequence one (TS1) being generated on detected lanes to start training the link (noted generally at signal 74). The host 62 waits for the response(s) to the TS1. After receipt of the response(s) to training sequence one, the host 62 sends a training sequence two (TS2) on the detected lanes (noted generally at signal 76). The host 62 then waits for the host receiver to complete a link training handshake (i.e., linkup) (noted generally at block 78).

Note that exemplary aspects of the present disclosure may also improve link training times regardless of whether the device(s) 66 are preprogrammed. That is, since the specification allows breaking the initial twelve (12) millisecond wait loop when the link counterpart (e.g., the device(s) 66) sends any signal, and the present disclosure causes signals to be sent, the host 62 will move more quickly into sending training sequences, and this, in turn, will cause the link counterpart to start detection immediately.

The initial twelve (12) milliseconds spent on signal detection (i.e., the line 64) are useful for dynamic systems in which PCIe cards may be added or removed with some regularity. In those instances, the host 62 does not know a priori which of the device(s) 66 may be present at start up. However, the time spent on such signal detection delays can be significant, especially in systems that require short power up times. For example, an automotive key performance indicator (KPI) requires system power up times of one hundred (100) milliseconds, of which twenty-four (24) milliseconds are spent in lane receiver detection. Even when all available lanes are detected, at least twelve (12) milliseconds will be spent on signal detection. Spending almost a quarter of the allocated time on lane receiver detection places additional burdens on system designers who must then perform the remaining power up activities in the diminished remaining time.

Exemplary aspects of the present disclosure are able to skip or eliminate the first signal detection period described above with respect to FIG. 6 by taking advantage of situations in which the devices in the computing system are static. For example, referring to FIG. 5A, the devices 56(1)-56(N) are unlikely to change after manufacturing. Accordingly, for situations in which the devices (e.g., devices 56(1)-56(N)) of the computing system are static, it is possible to inform the host of the expected devices before power up or hard resets. While specifically contemplated for hard resets, any reset which results in performing detection, (e.g., a "hot reset," a "warm reset," as those terms are defined in PCIe specification, or any other form of reset of any "communication bus reset" which causes detection) may utilize this a priori knowledge. That is, exemplary aspects of the present disclosure may be invoked every time link detection would normally occur.

Based on this a priori knowledge, the host may skip the signal detection step of the PCIe standard (or other initial delays during which links are detected). By saving these twelve (12) milliseconds, designers have greater flexibility in how the remaining time is used during power up. Further power savings may be achieved because the systems may enter a power down phase more often. That is, there are currently times when a power down or low power state is not entered because of the time required during a subsequent power up. However, exemplary aspects of the present disclosure shorten the time required in the subsequent power up and thus allow the systems to enter low power states more frequently.

Figure 7:
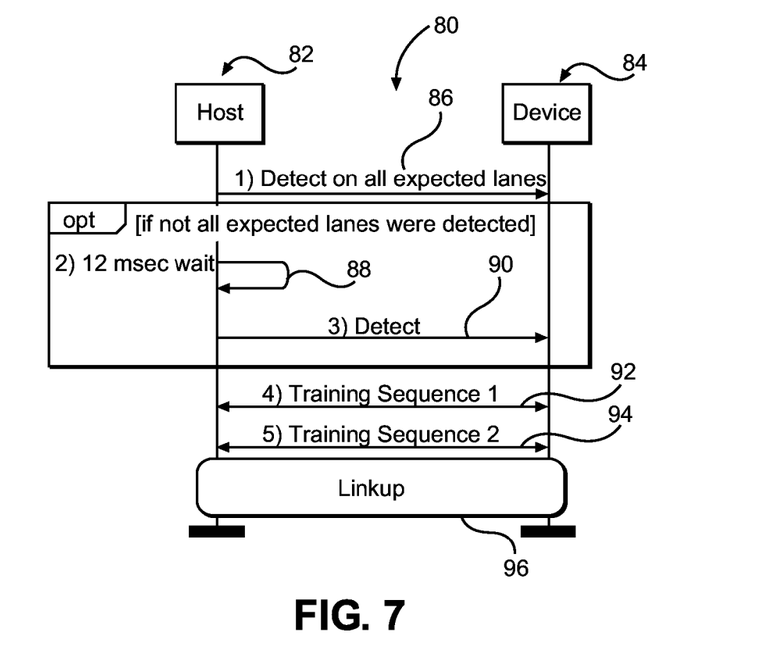
FIG. 7 is an link training flow diagram for a communication bus according to an exemplary aspect of the present disclosure.

In this regard, FIG. 7 illustrates a signal flow 80 between a host 82 and one or more devices 84. The signal flow 80 begins with the host 82 having a priori knowledge about expected ones of the one or more devices 84. In an exemplary aspect, the knowledge of expected lanes is provided by software. Accordingly, the host 82 performs receiver detection on all expected lanes (signal 86). If not all expected lanes respond to signal 86, an error condition may occur, and the host 82 may wait twelve (12) milliseconds (noted at line 88) and repeat the receiver detection on expected lanes (signal 90). Once all the expected lanes are detected, link training may begin with the host 82 sending the TS1 on the detected lanes to start training the link (signal 92). After completion of TS1, the host 82 may send TS2 (signal 94) to complete the link training handshake (i.e., linkup, noted at block 96).

As noted above, the knowledge of expected devices may come from software stored in an appropriate memory element. Alternatively, the knowledge may come from hardware such as blown or not blown fuses whose state indicates if a lane is present. Similarly, a lookup table formed from hardware or software may be used. Still other techniques to provide this information to a control system in the host are also within the scope of the present disclosure. As used herein, such techniques amount to an indication to the host of which links are expected. This indication may be provided to the root complex of the host.

Figure 8:
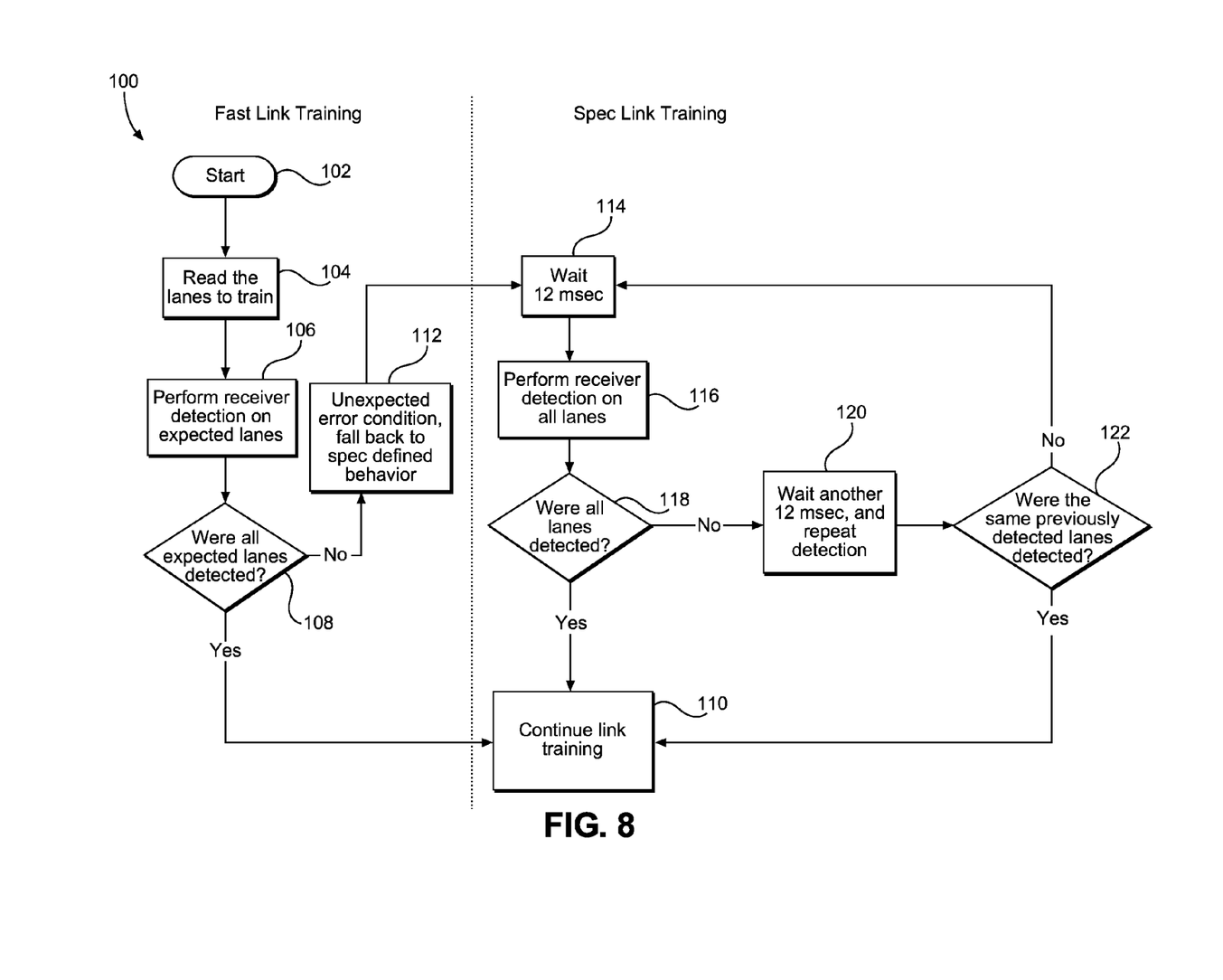
FIG. 8 is a flow chart illustrating a process according to an exemplary aspect of the present disclosure.

While FIG. 7 illustrates the signal flow 80, FIG. 8 provides a more conventional flow chart of a process 100 corresponding to the signal flow 80. While any of the computing devices disclosed herein (e.g., the computing devices 10, 20, 30, 40, or 52 of FIGS. 1-5A or the mobile terminal 160 of FIG. 5B) could implement this exemplary process, for the purpose of illustration, the computing device 52 of FIG. 5A and its corresponding elements are used. The process 100 starts (block 102). The control system of the host 54 reads the lanes to train (block 104). As noted above, the information relating to the lanes to train (i.e., the expected links) may be provided to the control system of the host 54 by software, a lookup table, fuses, a printed circuit board (PCB) configuration, a general purpose input output (GPIO) setting during the reset, or other technique. Note that in a further exemplary aspect, an initial power up may go through a standard specified detection process, but the configuration so detected is then saved (e.g., in the aforementioned lookup table) and subsequent reset events may rely on the fast training concepts disclosed herein. The host 54 then performs receiver detection on the expected lanes (block 106). The control system determines if all the expected lanes were detected (block 108). If the answer is yes, all the expected lanes were detected, the process 100 continues to link training (block 110) per the specification. As noted above, an exemplary aspect of the present disclosure is suitable for use with the PCIe specification, and the host 54 enters a POLLING.ACTIVE LTSSM (link training status and state machine) STATE per that specification.

With continued reference to FIG. 8, if the answer to block 108 is negative, the host 54 has an error condition and falls back to the normal link detection processes defined by the specification (block 112). Note that in an exemplary aspect (e.g., for the mobile terminal 160 of FIG. 5B, where there are a mix of static and dynamic endpoints, the host 162 may also perform a signal detection at block 108 or may force block 108 to be answered negatively). In particular, the host 54 waits twelve (12) milliseconds (block 114) and performs receiver detection on all lanes (block 116). The control system then determines if all lanes were detected (block 118). If the answer to block 118 is yes, then the process 100 continues with link training (block 110). If the answer to block 118 is negative, the host 54 waits another twelve (12) milliseconds and repeats detection (block 120). The control system of the host 54 determines if the detected lanes were the same as the lanes previously detected (block 122). If the answer to block 122 is yes, then link training begins (block 110). If the answer to block 122 is negative, then the process 100 returns to block 114, as indicated.

While the present disclosure has focused on eliminating the initial twelve (12) millisecond delay at each stage, such delay does not have to be entirely eliminated. That is, shorter delays may still be enabled, and the incremental time savings relative to the standard specified twelve (12) millisecond delay may still be better than the standard specified twelve (12) millisecond delay.

While the present disclosure has focused on the link configuration arrangement between a host and one or more devices, the present disclosure is not so limited. In particular, a switch may be positioned between the host and the devices and the link configuration training performed by the switch may utilize concepts disclosed herein. For example, a PCIe switch may connect a single PCIe root complex to multiple PCIe endpoints, and the PCIe switch may implement exemplary aspects of the fast link training disclosed herein.

The fast link training in embedded systems according to aspects disclosed herein may be provided in or integrated into any processor-based device. Examples, without limitation, include: a set top box, an entertainment unit, a navigation device, a communication device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
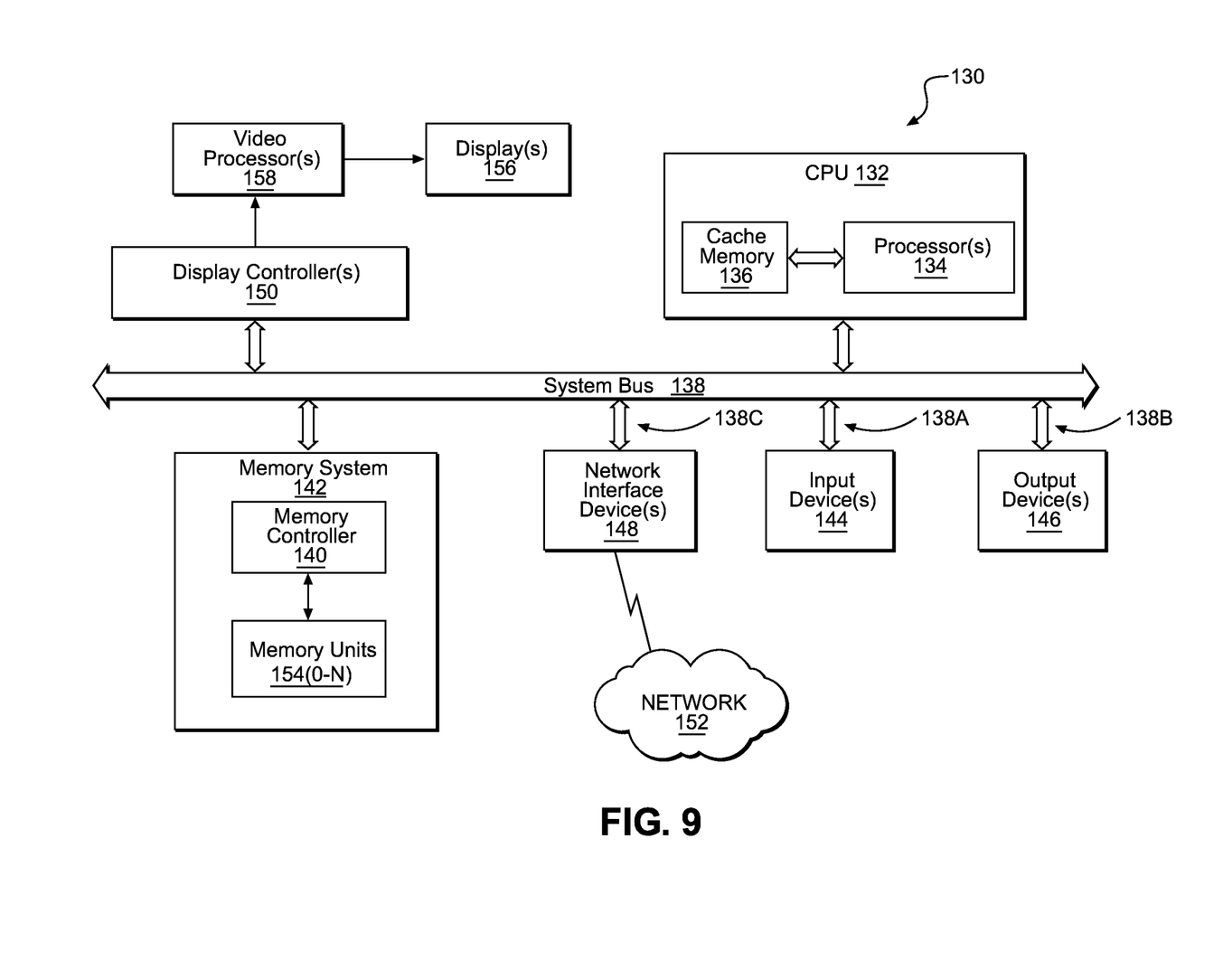
FIG. 9 is a block diagram of an exemplary processor-based system that can include the embedded communication bus of FIGS. 1-4.

In this regard, FIG. 9 illustrates an example of a processor-based system 130 that can employ the computing devices 10, 20, 30, 40, and 52 or the mobile terminal 160 illustrated in FIGS. 1-5B. In this example, the processor-based system 130 includes one or more central processing units (CPUs) 132, each including one or more processors 134. The CPU(s) 132 may have cache memory 136 coupled to the processor(s) 134 for rapid access to temporarily stored data. The CPU(s) 132 is coupled to a system bus 138 and can intercouple devices included in the processor-based system 130. As is well known, the CPU(s) 132 communicates with these other devices by exchanging address, control, and data information over the system bus 138. For example, the CPU(s) 132 can communicate bus transaction requests to a memory controller 140. Although not illustrated in FIG. 9, multiple system buses 138 could be provided.

Other devices can be connected to the system bus 138. As illustrated in FIG. 9, these devices can include a memory system 142, one or more input devices 144, one or more output devices 146, one or more network interface devices 148, and one or more display controllers 150, as examples. It should be appreciated that the connection to the input devices 144, the output devices 146, and the network interface devices 148 may be PCIe-compliant communication buses 138A, 138B, and 138C respectively. In an exemplary aspect, the communication buses 138A, 138B, and 138C are a single shared bus, while in an alternate aspect, the communication buses 138A, 138B, and 138C are distinct, separate buses. Note further that the communication buses 138A, 138B, and 138C may be coupled to the system bus 138 (as illustrated) or have independent connections (not shown) to the CPU(s) 132. The input device(s) 144 can include any type of input device, including, but not limited to: input keys, switches, voice processors, etc. The output device(s) 146 can include any type of output device, including, but not limited to: audio, video, other visual indicators, etc. In an exemplary aspect of the present disclosure, a communication bus may couple a host to one or more of the output devices 146. The network interface device(s) 148 can be any devices configured to allow exchange of data to and from a network 152. The network 152 can be any type of network, including, but not limited to: a wired or wireless network, a private or public network, a local area network (LAN), a wide area network (WAN), a wireless local area network (WLAN), a BLUETOOTH™ network, and the Internet. The network interface device(s) 148 can be configured to support any type of communication protocol desired. The memory system 142 can include one or more memory units 154(0-N). The memory system 142 may be the memory element that stores the software of the present disclosure.

The CPU(s) 132 may also be configured to access the display controller(s) 150 over the system bus 138 to control information sent to one or more displays 156. The display controller(s) 150 sends information to the display(s) 156 to be displayed via one or more video processors 158, which process the information to be displayed into a format suitable for the display(s) 156. The display(s) 156 can include any type of display, including, but not limited to: a cathode ray tube (CRT), a liquid crystal display (LCD), a light emitting diode (LED) display, a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of link detection for a communication bus, comprising:
   providing an indication to a host which links are expected;
   based on the indication, testing expected links;
   receiving at least a response from a device associated with at least one expected link; and
   training the device associated with the at least one expected link.

2. The method of claim 1, wherein providing the indication to the host comprises providing the indication to a control system.

3. The method of claim 1, wherein providing the indication to the host comprises providing the indication to a root complex within the host.

4. The method of claim 3, wherein the root complex complies with a peripheral component interface (PCI) express (PCIe) standard.

5. The method of claim 1, wherein providing the indication comprises providing the indication through software.

6. The method of claim 1, wherein providing the indication comprises providing the indication through a lookup table.

7. The method of claim 1, wherein providing the indication comprises providing the indication with hardware.

8. The method of claim 7, wherein providing the indication comprises providing the indication through one or more fuses.

9. The method of claim 1, wherein providing the indication comprises providing the indication at power up.

10. The method of claim 1, wherein providing the indication comprises providing the indication at a reset.

11. The method of claim 1, further comprising generating an error condition if one of the expected links fails to respond.

12. The method of claim 1, further comprising skipping signal detection for the expected links.

13. The method of claim 1, wherein testing the expected links comprises performing receiver detection on all the expected links without waiting for signal detection on the expected links.

14. The method of claim 1, further comprising performing receiver detection for links other than the expected links.

15. The method of claim 14, further comprising repeating receiver detection for links other than the expected links.

16. The method of claim 15, further comprising training other devices associated with the links other than the expected links.

17. The method of claim 1, wherein the at least one expected link comprises a plurality of lanes.

18. The method of claim 1, wherein providing the indication to the host comprises providing the indication to one or more of:
    a control system; and
    a root complex within the host;
    wherein providing the indication comprises providing the indication through one or more techniques selected from the group consisting of: software, a lookup table, hardware, a printed circuit board (PCB) configuration), a general purpose input output (GPIO) setting, and one or more fuses.

19. The method of claim 1, wherein providing the indication comprises providing the indication at power up and at subsequent resets.

20. The method of claim 1, wherein providing the indication comprises learning a configuration at an initial power up and providing the indication at subsequent resets.

21. A host comprising:
    a bus interface configured to be connected to a communication bus; and
    a control system operatively coupled to the bus interface, the control system configured to:
        receive an indication which links for the communication bus are expected;
        based on the indication, test expected links across the communication bus;

receive at least a response from a device associated with at least one expected link; and train the device associated with the at least one expected link.

22. The host of claim 21, further comprising a memory element associated with the control system, the memory element comprising software to provide the indication.

23. The host of claim 21, further comprising a memory element associated with the control system, the memory element comprising a lookup table to provide the indication.

24. The host of claim 21, wherein the bus interface is configured to couple to a peripheral component interface (PCI) express (PCIe) communication bus.

25. The host of claim 21, further comprising one or more fuses associated with the control system to provide the indication.

26. The host of claim 21, wherein the control system is configured to receive the indication at power up.

27. The host of claim 21, wherein the control system is configured to receive the indication at a reset.

28. The host of claim 21, wherein the control system is configured to generate an error condition if one of the expected links fails to respond.

29. The host of claim 21, wherein the control system is further configured to skip signal detection for the expected links.

30. The host of claim 21, wherein the control system is configured to test the expected links by performing receiver detection on all the expected links without waiting for signal detection on the expected links.

31. The host of claim 21 integrated into an integrated circuit (IC).

32. The host of claim 21 integrated into a device selected from the group consisting of: a set top box; an entertainment unit; a navigation device; a communication device; a fixed location data unit; a mobile location data unit; a mobile phone; a cellular phone; a computer; a portable computer; a desktop computer; a personal digital assistant (PDA);

a monitor; a computer monitor; a television; a tuner; a radio; a satellite radio; a music player; a digital music player; a portable music player; a digital video player; a video player; a digital video disc (DVD) player; and a portable digital video player.

33. A computing system comprising:

a communication bus;

a plurality of devices, each device comprising a device bus interface connected to the communication bus; and a host comprising:

a bus interface connected to the communication bus; and a control system operatively coupled to the bus interface, the control system configured to:

receive an indication which links for the communication bus are expected to exist for respective ones of the plurality of devices;

based on the indication, test expected links across the communication bus;

receive at least a response from a device associated with at least one expected link; and train the device associated with the at least one expected link.

34. The computing system of claim 33, wherein the communication bus comprises a peripheral component interface (PCI) express (PCIe) communication bus.

35. The computing system of claim 33 integrated into an automobile.

* * * * *